United States Patent [19]
Guichard

[11] Patent Number: 6,110,064
[45] Date of Patent: Aug. 29, 2000

[54] TRANSMISSION CHAIN

[75] Inventor: Daniel Guichard, La Cote St. Andre, France

[73] Assignee: Sachs Industries S.A. (Huret et Maillard Reunis), De-Bressieux, France

[21] Appl. No.: 08/927,226

[22] Filed: Sep. 10, 1997

[30] Foreign Application Priority Data

Sep. 19, 1996 [FR] France .................................. 96 11437

[51] Int. Cl.⁷ .................................................. F16G 13/02
[52] U.S. Cl. ......................................... 474/231; 474/230
[58] Field of Search ................................ 474/231, 230, 474/206, 156, 111, 212, 91, 229, 221, 220, 157, 225, 228, 223, 234, 273, 207

[56] References Cited

U.S. PATENT DOCUMENTS

| | | | |
|---|---|---|---|
| 818,469 | 4/1906 | Rogers | 474/231 X |
| 1,670,278 | 5/1928 | Belcher | 474/157 X |
| 2,182,443 | 12/1939 | McAninch | 474/231 X |
| 4,729,756 | 3/1988 | Zimmer | 474/231 X |
| 5,073,153 | 12/1991 | Wu | 474/212 X |
| 5,178,585 | 1/1993 | Lin et al. | 474/206 |

FOREIGN PATENT DOCUMENTS

| | | | |
|---|---|---|---|
| 974976 | 9/1948 | France | 474/231 |
| 93624 | 10/1896 | Germany . | |
| 91 01 113 | 6/1991 | Germany . | |
| 93 09 645 | 10/1993 | Germany . | |
| 447234 | 11/1948 | Italy | 474/231 |
| 8849 | 4/1896 | United Kingdom | 474/231 |
| 193547 | 9/1922 | United Kingdom | 474/231 |
| 2 117 084 | 10/1983 | United Kingdom . | |
| 2 257 221 | 1/1993 | United Kingdom . | |
| 2 260 592 | 4/1993 | United Kingdom . | |

*Primary Examiner*—David A. Bucci
*Assistant Examiner*—Marcus Charles
*Attorney, Agent, or Firm*—Baker & Daniels

[57] ABSTRACT

A transmission chain
  formed of alternating outer chain links (2) and inner chain links (3), connected by pins (4);
  the outer chain links (2) and the inner chain links (3) being formed of outer plates (21) and inner plates (31);
  each outer plate (21) and inner plate (31) having two widened ends (23,33) each provided with a hole (25, 35) to accommodate the pin (4) and connected by a connection part (24,34) characterized in that
the connecting parts (24,34) of the plates (21,31) comprise apertures (26,36) and the pins (4) are hollow.

1 Claim, 3 Drawing Sheets

TRANSMISSION CHAIN

The present invention relates to a transmission chain, in particular for a bicycle, formed of alternating outer chain links and inner chain links connected by pins, the outer chain links and the inner chain links being formed of outer plates and inner plates, each outer plate and inner plate having two widened ends each provided with a hole to accommodate the pin, and connected by a connection part.

Chains of this type are known.

Thus, according to document G 93 09 645.3 there is known a chain in which the plates of the outer chain links each comprise a recess, of circular shape, in order that the chain may be better guided on the teeth of the pinions, the teeth entering the gaps between the edges of the two recesses.

Besides the difficulty of using a chain of this type, which is relatively noisy owing to the contact between the teeth and the edges of the recesses, this chain is as heavy as a conventional chain and, furthermore, the recesses which form a passage, and the parts in relief, form traps for dirt and make the function of the chain relatively difficult and complicate the cleaning thereof.

The object of the present invention is to overcome these disadvantages and to propose the production of a light and strong chain, avoiding picking up dirt or assisting the removal thereof and the circulation of the lubricant or the cleaning liquid.

To this end, the invention relates to a chain of the type defined hereinabove, characterised in that the parts connecting the plates comprise apertures and the pins are hollow.

Owing to the apertures in the outer chain link and inner chain link, and to the hollow pins, the chain according to the invention is much lighter than a conventional chain of the same strength. This weight advantage contributes to the desired general objective to reduce the weight of the bicycle. Furthermore, this chain only has a very small surface which can pick up dirt as a result of the break formed in the connection part by the apertures. This break in the surface of the connection parts of the plates of the chain links extends both in the vertical and horizontal directions.

These apertures likewise facilitate the movement of lubricant and cleaning liquid.

According to a further embodiment of the invention, the aperture of the plates is elongate and its ends are rounded. This aperture corresponds to the mechanically inactive part of the structure of each plate.

In an advantageous manner, the ends of the hollow pin comprise recesses which allow the end to be opened slightly in order to stake the pin on the two plates of the external chain link.

The present invention will be described in a more detailed manner with the aid of the attached drawings, in which.

Figure 1:
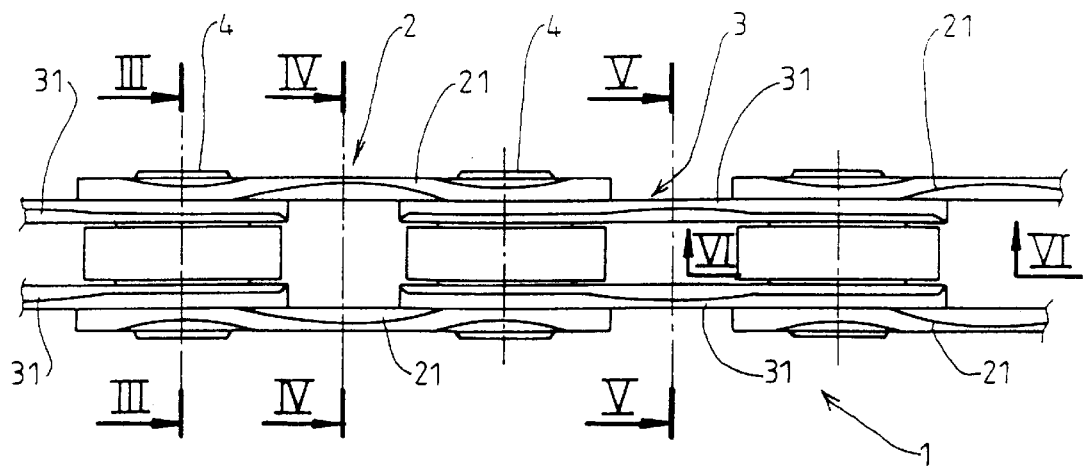
FIG. 1 is a plan view of a chain according to the invention.
Figure 2:
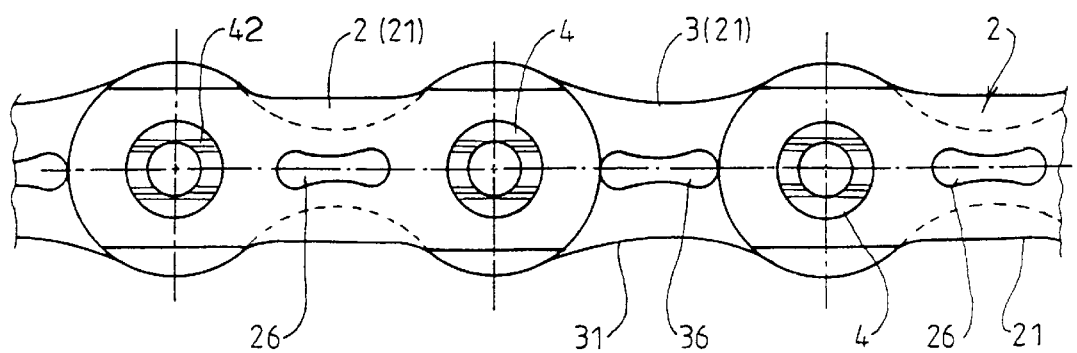
FIG. 2 is a side view of the chain shown in FIG. 1.

According to FIGS. 1 and 2, the invention relates to a transmission chain, in particular for a bicycle. This chain is designated as a whole by the reference numeral 1 and is formed of outer chain links 2 and inner chain links 3. The chain links alternate and are joined at their ends by pins 4.

The outer chain links 2 are formed of two outer plates 21 and the inner plates 3 are formed of two inner plates 31.

Figure 6:
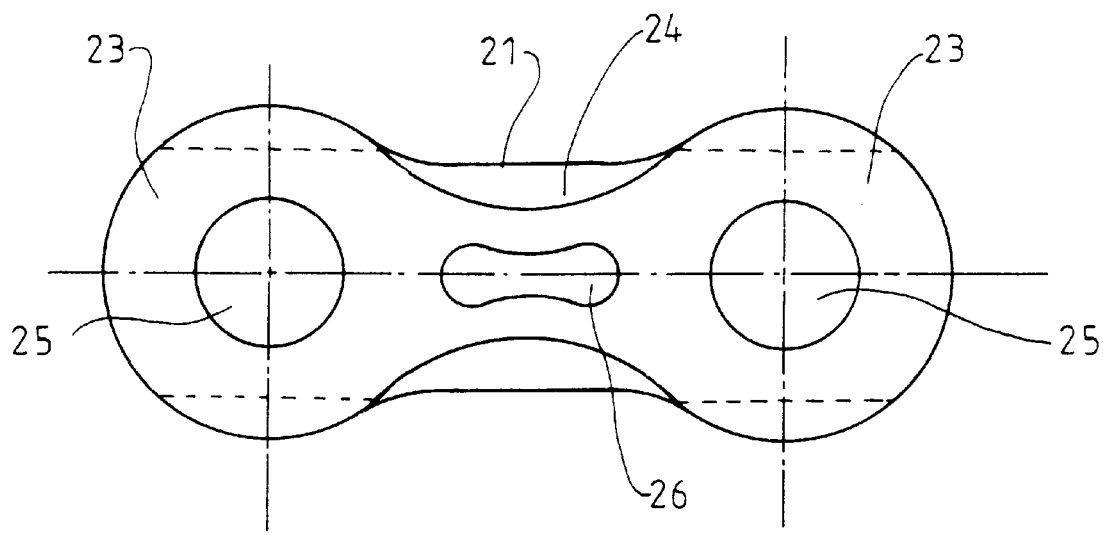
FIG. 6 is a sectional view in the direction of the arrow VI in FIG. 1 of an outer plate according to the invention.
Figure 7:
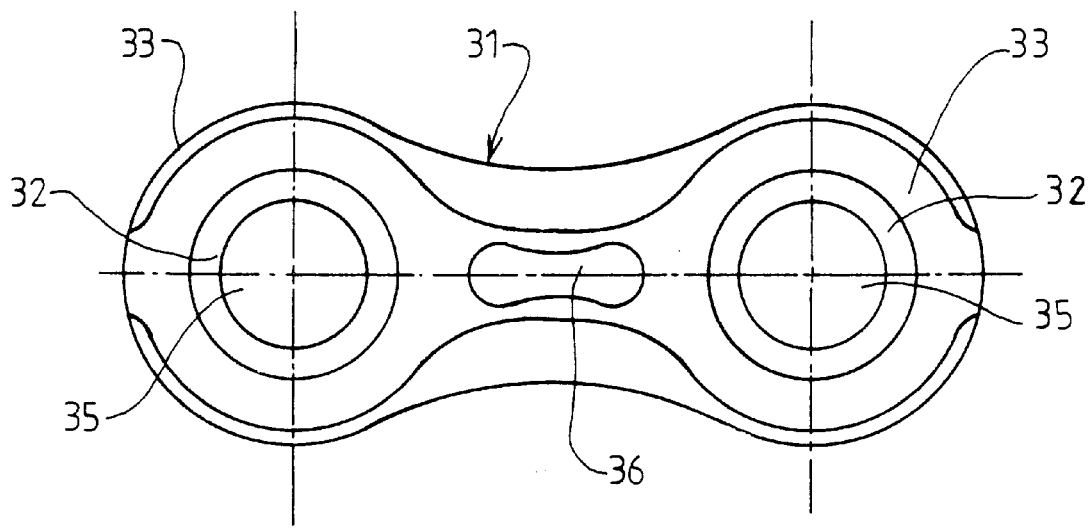
FIG. 7 is a view in the direction of the arrow VII in FIG. 1 of an inner plate according to the invention.

The outer plates 21 are shown in FIG. 6 and the inner plates 31 in FIG. 7.

The outer plates 21 comprise two widened ends 23 connected by a connection part 24. The widened ends 23 are each provided with a hole 25 for the passage of the pin 4. The connection part 24 is provided with an aperture 26 according to the invention.

The same applies in the case of the structure of the inner plates 31 according to FIG. 7. These plates 31 comprise two widened ends 33, provided with a barrel 32 bordering the hole 35 through which the pin passes. These inner plates 31 are likewise provided with an aperture 36.

The apertures 26, 36 are elongate, the ends thereof are rounded and the width thereof is larger than the intermediate part, having, substantially, the shape of chain links.

Figure 3:
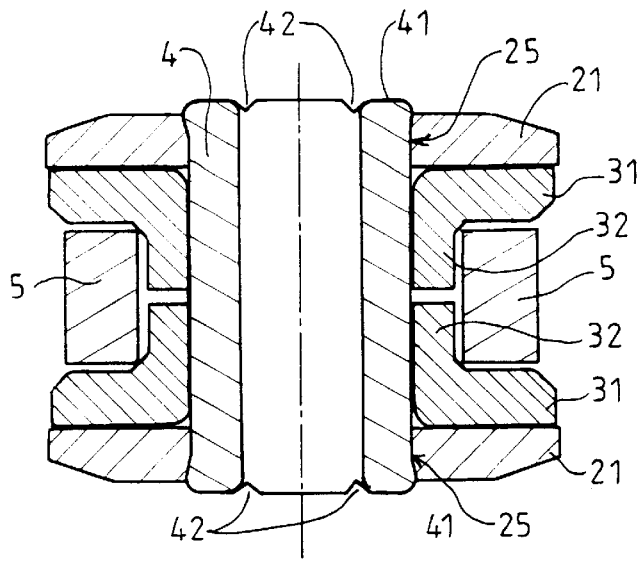
FIG. 3 is a sectional view along the line III—III in FIG. 1 in enlarged scale.

The assembly of the inner and outer chain links and the pin can be seen more clearly from FIG. 3. This Figure shows the outer chain links 21 to which the pin 4 is connected by staking. This pin supports the inner chain links 31 on the barrel 32. Finally, the barrels 32 support the rollers 5.

Figure 4:
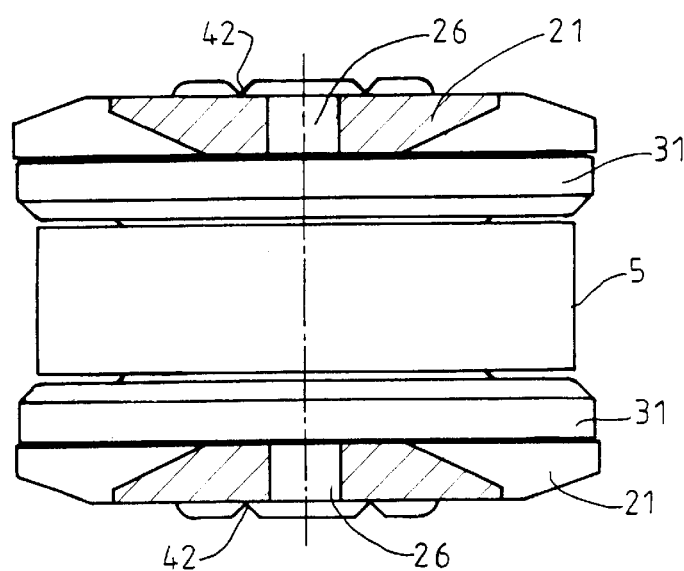
FIG. 4 is a sectional view along the line IV—IV in FIG. 1 in enlarged scale.
Figure 5:
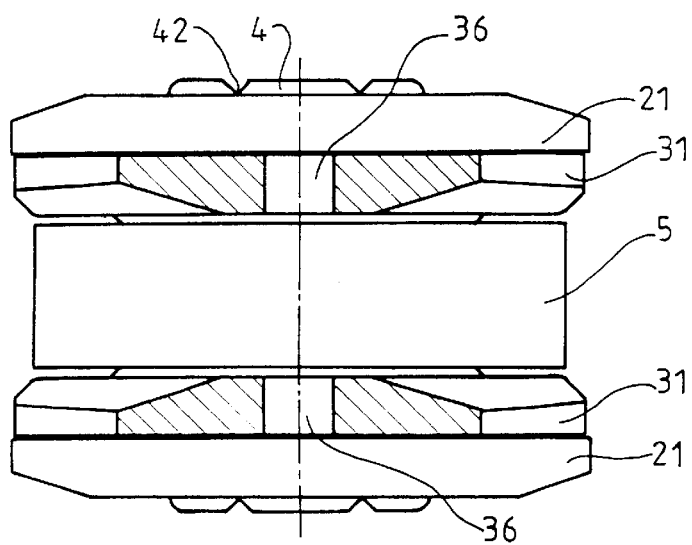
FIG. 5 is a sectional view along the line V—V in FIG. 1 on the enlarged scale.

FIG. 3 shows, as is, furthermore, the case in FIGS. 4 and 5, the shape of the ends 41 of the pin which comprises the recesses 42 facilitating the staking of the pin in the holes 25 of the outer chain links 21.

FIGS. 4 and 5 show, in a more detailed manner, the section of the outer chain links (FIG. 4) and inner chain links (FIG. 5) to the right of the aperture 26, 36.

These sections likewise show the particular known shape of the plates with thin parts to facilitate the contact and the meshing of the teeth of the pinions.

The invention is not restricted to the embodiment described and shown. In particular, the outer or inner plates may comprise a connection part of greater width.

The invention relates both to transmission chains for bicycles and to gear chains for automobile vehicles, mopeds or industrial machinery.

What is claimed is:

1. A transmission chain for use in bicycles, comprising:

alternating outer chain links and inner chain links connected by hollow pins having first and second ends comprising first and second axial surfaces, respectively;

said outer chain links and said inner chain links comprising outer plates and inner plates, respectively;

each said outer plate and each said inner plate having two widened plate ends, each said widened plate end provided to with hole to accommodate one of said pins, said widened plate ends of each said inner and said outer plate being connected by a connection part;

said connection parts of said inner and said outer plates comprising apertures having enlarged rounded ends; and each said inner plate having a barrel extending therefrom, said barrels adapted to support a roller;

wherein said first and said second axial surfaces of each said hollow pin end is provided with a plurality of staking recesses, each said staking recess forms a chord on the axial surface, each said hollow pin end being staked, whereby said pin ends are deformed to a size larger than the diameter of said holes in said outer plates.

* * * * *